(12) United States Patent
Sado

(10) Patent No.: US 7,006,322 B2
(45) Date of Patent: Feb. 28, 2006

(54) METHOD AND APPARATUS FOR PERFORMING SELF-SERVO WRITING IN A DISK DRIVE

(75) Inventor: Hideo Sado, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 207 days.

(21) Appl. No.: 10/427,913

(22) Filed: May 2, 2003

(65) Prior Publication Data

US 2003/0218821 A1    Nov. 27, 2003

(30) Foreign Application Priority Data

May 22, 2002    (JP) ............................. 2002-147628

(51) Int. Cl.
*G11B 21/02* (2006.01)

(52) U.S. Cl. ...................................... 360/75

(58) Field of Classification Search ............... 360/75, 360/53, 48
See application file for complete search history.

(56) References Cited

U.S. PATENT DOCUMENTS

| | | | |
|---|---|---|---|
| 5,375,020 A * | 12/1994 | Aggarwal et al. ............ | 360/75 |
| 5,448,429 A   | 9/1995  | Cribbs et al. | |
| 5,452,165 A * | 9/1995  | Chen et al. ................. | 360/121 |
| 5,867,337 A   | 2/1999  | Shimomura | |
| 6,040,955 A   | 3/2000  | Brown et al. | |
| 6,181,500 B1 * | 1/2001 | Serrano et al. ............... | 360/53 |
| 6,317,285 B1  | 11/2001 | Bi et al. | |
| 6,519,107 B1 * | 2/2003 | Ehrlich et al. ................ | 360/75 |
| 6,600,620 B1 * | 7/2003 | Krounbi et al. ............... | 360/75 |
| 6,631,046 B1 * | 10/2003 | Szita et al. ................... | 360/75 |
| 6,643,082 B1 * | 11/2003 | Belser .......................... | 360/48 |
| 6,735,031 B1 * | 5/2004 | Chainer et al. ............... | 360/51 |

FOREIGN PATENT DOCUMENTS

| JP | 8-129732 | 5/1996 |
|---|---|---|
| JP | 10-334428 | 12/1998 |
| JP | 2000-100098 | 4/2000 |

OTHER PUBLICATIONS

Search and Examination Reports, dated Feb. 12, 2004, from the Austrian Patent Office for Patent Application No. 200302483-3.

* cited by examiner

*Primary Examiner*—K. Wong
(74) *Attorney, Agent, or Firm*—Pillsbury Winthrop Shaw Pittman, LLP

(57) ABSTRACT

Disclosed herein is a self-servo writing method that uses the head of a disk drive to write servo data on a disk-shaped medium. This method calculates an accurate position offset between the read-head element and write-head element incorporated in the head, by using the positioning servo data and measuring servo data that are recorded on the disk-shaped medium.

9 Claims, 5 Drawing Sheets

METHOD AND APPARATUS FOR PERFORMING SELF-SERVO WRITING IN A DISK DRIVE

CROSS-REFERENCE TO RELATED APPLICATIONS

This application is based upon and claims the benefit of priority from the prior Japanese Patent Application No. 2002-147628, filed May 22, 2002, the entire contents of which are incorporated herein by reference.

BACKGROUND OF THE INVENTION

1. Field of the Invention

The present invention generally relates to a disk drive. More particularly, the invention relates to a method of perform servo writing for recording servo data on a disk-shaped medium.

2. Description of the Related Art

Most disk drives, a represented by hard disk drives, incorporate a servo system. The servo system controls the positioning of the head (magnetic head), or moves the head to a desired track on the disk-shaped medium, i.e., a data recording medium. The servo system controls the positioning of the head, by using the servo data recorded on the disk-shaped medium.

A method of manufacturing a disk drive includes a servo writing step, i.e., the step of recording servo data on the disk-shaped medium. A self-servo writing method is known, which is performed in the servo writing step. The self-servo writing method uses the head and actuator that are incorporated in the disk drive.

The disk drives developed in recent years incorporate a head that comprises a read-head element and a write-head element, both mounted on the same slider and separated from each other. The write-head element records data on a disk-shaped medium. The read-head element reads the data recorded on the disk-shaped medium. The read-head element has an MR (magnetoresistive) element in most cases.

The self-servo writing method uses the write-head element of the head incorporated in the disk drive, thereby writing servo data on the disk-shaped medium. The read-head element reads the servo data thus written on the disk-shaped medium.

In the servo writing step, it is necessary to write the servo data, precisely at a prescribed position on the disk-shaped medium. The head incorporated in the disk drive comprises two discrete elements, i.e., the read-head element and the write-head element. A position offset inevitably exists between these elements. The position offset corresponds to the distance between the centerlines of the read- and write-head elements. Hence, the head-positioning control must be carried out in the self-servo writing step, in accordance with the position offset between the read- and write-head elements.

More specifically, the position offset must be measured and the offset must be adjusted in accordance with the position offset measured, in order to control the positioning of the head. A method is proposed and developed, in which the position offset is measured by using a measuring pattern written on the disk shaped medium. (See, for example, Jpn. Pat. Appln. KOKAI Publication No. 8-129732.) This prior-art method uses a servo-burst pattern contained in the servo data, thereby to writing a measuring pattern on the disk-shaped medium. In this method, the measuring pattern is used, determining the distance between the centerline of the read-head element and one end of the write-head element and also the distance between the centerline and the other end of the write-head element. The distance from the centerline of the write-head element is obtained from the average of these distances determined. The position offset is thereby calculated.

Another prior-art method is proposed, which uses a servo-burst pattern to measures the position offset. (See, for example, Jpn. Pat. Appln. KOKAI Publication No. 10-334428.) In this method, the servo data for measuring the offset is written on the disk-shaped medium and the position error read from this servo data is applied as the position offset between the read- and write-head elements.

In short, the pattern for measuring the offset is merely a servo-burst pattern that is repeated, each time for one of the tracks provided on the disk-shaped medium. However, the position offset between the read- and write-head elements used in the disk drives developed in recent years amounts to several track intervals. This is because these disk drives record data on the disk-shaped medium at a high linear recording density.

With the conventional method using the measuring pattern that is only a servo-burst pattern, it is difficult to measure the position offset between the read- and write-head elements, directly and accurately. Unless the position offset is measured with high accuracy, no successful self-servo writing step can be carried out.

The conventional method using the measuring pattern that is only a servo-burst pattern can hardly measure the position offset between the read- and write-head elements, directly and accurately. It is therefore demanded that the position offset between the read- and write-head elements be measured with high precision to perform a successful self-servo writing step.

BRIEF SUMMARY OF THE INVENTION

In accordance with one embodiment of the invention, there is provided a self-servo writing method that can measure an accurate position offset between the read-head element and write-head element incorporated in a disk drive, before servo data is recorded on the disk-shaped medium that is provided in the disk drive.

The self-servo writing method comprises: reading positioning servo data recorded on the disk-shaped medium by using the read-head element; positioning the write-head element at a desired track provided on the disk-shaped medium, by using the positioning servo data read by the read-head element; recording measuring servo data in the desired track by using the write-head element; and calculating a position offset between the read-head element and the write-head element, from the positioning servo data and the measuring servo data, both read by the read-head element from the disk-shaped medium.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of this invention will be described, with reference to the accompanying drawings.

(Disk Drive and Servo Writer)

Figure 1:
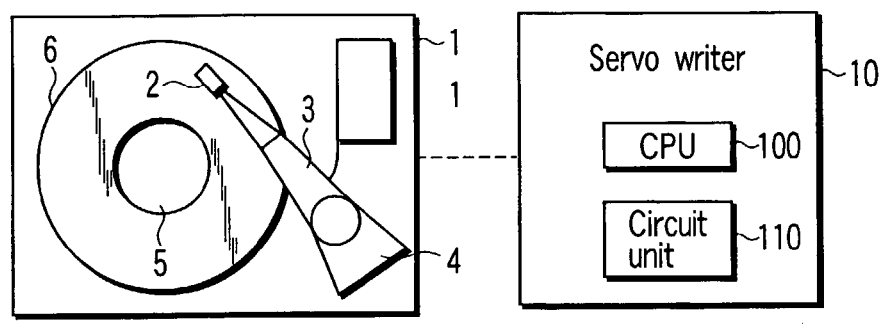
FIG. 1 is a block diagram showing the major components of a disk drive and servo writer according to an embodiment of the present invention.

FIG. 1 shows a disk drive 1 and a servo writer 10, both according to the present embodiment.

The disk drive 1 incorporates a drive mechanism. The drive mechanism comprises a head 2, an actuator 3, a voice coil motor (VCM) 4, a spindle motor 5, and a disk-shaped medium 6. The head 2 is mounted on the actuator 3. The disk-shaped medium 6 is secured to the spindle motor 5. The disk drive 1 comprises a circuit unit 7, in addition to the drive mechanism. The circuit unit 7 includes a head amplifier IC, a read/write channel, a microprocessor, a disk controller and the like.

The actuator 3 moves in the radial direction of the disk-shaped medium 6 when driven by the voice coil motor 4. It is a mechanism for positioning the head 2 over the disk-shaped medium 6. The head 2 has a write-head element and a read-head element. The write-head element is designed to write data on the disk-shaped medium 6. The read-head element is configured to read data from the disk-shaped medium 6.

Figure 3:
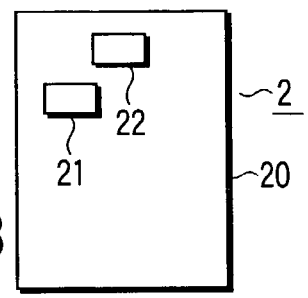
FIG. 3 is a diagram illustrating the positional relation between the read-head element and the write-head element, both provided in the embodiment.

As FIG. 3 shows, the head 2 is of the type in which the read-head element 21 and the write-head element 22 are mounted on a slider 20, spaced from each other. The read-head element 21 is a magnetoresistive element, as in most cases. The write-head element 22 is a thin-film, inductive head element. The head elements 21 and 22 are arranged, one staggered with respect to the other.

Figure 4A:
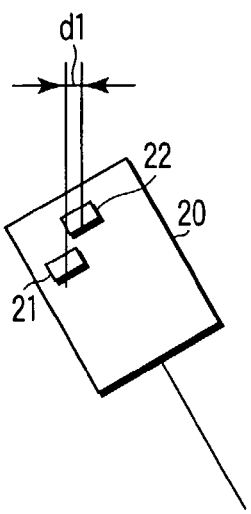
FIGS. 4A to 4C are diagrams showing how the position offset between the read- and write-head elements varies.
Figure 4B:
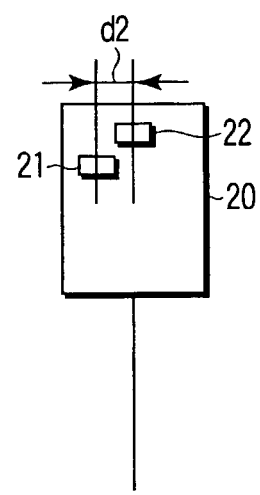
Figure 4C:
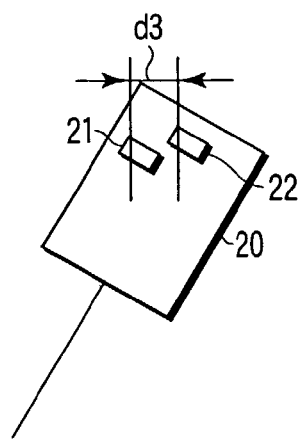

FIGS. 4A to 4C are diagrams showing how the position offset between the head elements 21 and 22 changes. As seen from FIGS. 4A to 4C, the offset changes from d1 to d2, and thence to d3, as the head moves over the disk-shaped medium 6.

More precisely, FIG. 4A shows the position offset d1 that exists when the head 2 stays over an inner track provided on the disk-shaped medium 6. FIG. 4B indicates the position offset d2 that exists when the head 2 stays over an intermediate track provided on the medium 6. FIG. 4C depicts the position offset d3 that exists when the head 2 stays over an outer track provided on the medium 6.

It is desired that the read-head element 21 and the write-head element 22 assumes the same positional relation, at wherever position over the disk-shaped medium 6, as in any disk drive that perform the self-servo writing method. That is, the head elements 21 and 22 should be positioned as illustrated in FIG. 3 (thereby providing an offset). In other words, the read-head element 21 should be closer to the center of the disk-shaped medium 6 than the write-head element 22.

(Outline of Self-Servo Writing Method)

A self-servo writing method performs a self-servo writing step in the present embodiment. The self-servo writing method is to record servo data on the disk-shaped medium 6, by using the head 2 and the actuator mechanism (including VCM 4) that are incorporated in the disk drive 1.

The servo writer 10 has a CPU 100 and a circuit unit 110. The CPU 100 (including software) controls the VCM 4 of the disk drive 1 to position the head 2 at a desired track. The CPU 100 performs the self-servo writing control including the calculation of a position offset, which characterizes the present embodiment. The circuit unit 110 has various circuits. One circuit generates a servo pattern that corresponds to servo data to be recorded on the disk-shaped medium 6. Another circuit generates timing signals.

Figure 2:
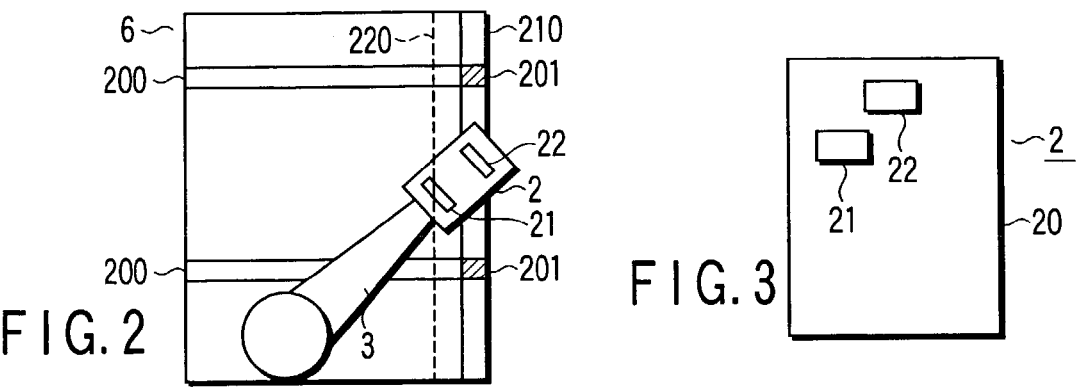
FIG. 2 is a diagram outlining a method of writing servo data in the embodiment.

As seen from FIG. 2, the self-servo writing method uses the write-head element 22 of the head 2 incorporated in the disk drive, to record servo data (servo pattern) 201 in the desired track on the disk-shaped medium 6. The method uses the servo data 200 that the read-head element 21 of the head 2 has read from the medium 6, to move the write-head element 21 to the position where data should be written on the disk-shaped medium 6.

As FIG. 2 shows, the reference position 220 is set for the read-head element 21 on the basis of the position offset between the read-head element 21 and the write-head element 22, so that the write-head element 22 may be positioned right over the desired track 210.

The CPU 100 of the servo writer 10 receives the servo data 200 read by the read-head element 21. From the servo data 200 the CPU 100 calculates the position error the read-head element 21 has with respect to the reference position 220. In accordance with the position error the CPU 100 controls the positioning of the read-head element 21. To accomplish the self-servo writing method in success, it is necessary to store the data that represents the positional relation (position offset) between the read-head element 21 and the write-head element 22.

(Self-Servo Writing Step)

Figure 5:
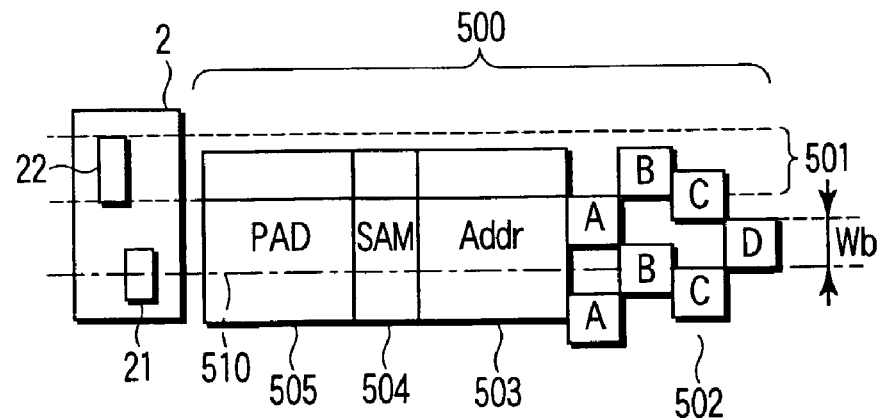
FIG. 5 is a diagram representing an example of servo data recorded on the disk-shaped medium used in the embodiment.

FIG. 5 is a diagram representing the servo data 500 written in the self-servo writing step on the disk-shaped medium 6 that is provided in the disk drive 1. The servo data 500 has a servo-burst pattern (position error pattern) 502, a track (cylinder)-address code 503, a servo-mark signal 504, and a dummy signal 505. The servo-mark signal 504 indicates a servo area. The dummy signal 505 is used to adjust the servo-data write timing. The process of adjusting the servo-data write timing is called "padding."

The servo writer 10 causes the write-head element 22 to write the servo data 500 in a track 501 when the head 2 of the disk drive 1 is positioned at the track 501 as the CPU 100 controls the positioning of the write-head element 22. At this time, the servo writer 10 controls the positioning of the head 2 to position the read-head element 21 with respect to the reference position 510 that has been set on the basis of the position offset between the read- and write-head elements.

In the servo writing step, the write width Wb of the servo-burst pattern contained in the servo data 500 is determined by the track density only, irrespective of the width of the write-head element 22. That is, the write width Wb is equivalent to the feed pitch of the write-head element 22. The boundary of the servo data 500 does not lie on the centerline of the write-head element 22. Rather, it is defined by one end of the centerline of the element 22.

Thus, the servo writer 10 writes the servo data 500 in the track 501, while the position of the write-head element 22 is adjusted on the basis of the position offset between the read- and write-head elements.

Figure 6A:
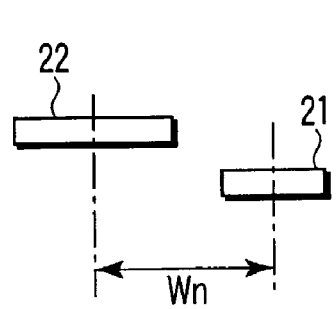
FIGS. 6A and 6B are diagrams defining the position offset between the read- and write-head elements in the embodiment.
Figure 6B:
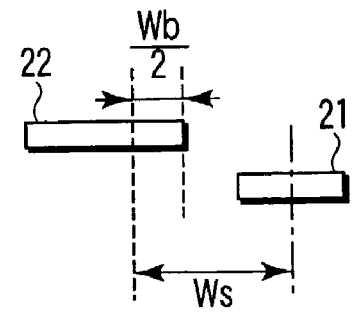

The position offset between the read- and write-head elements, which exists during the self-servo writing step, will be defined with reference to FIGS. 6A and 6B.

FIG. 6A illustrates the position offset Wn between the read- and write-head elements, which should be considered to achieve normal read/write operation of the disk drive 1. In the normal read/write operation, a position offset is applied to enable the read-head element 21 to read user data from the disk. This position offset corresponds to the distance between the centerline of the read-read element 21 and the centerline of the write-head element 22. It is defined as a position offset Wn between the read- and write-head elements.

In the self-servo write step, the position offset Ws between the read- and write-head elements is set on the basis of the write width Wb of the servo-burst pattern (i.e., feed pitch of the write-head element 22), as may be understood from FIG. 6B. To more specific, this position offset Ws is defined as the distance between a specific point and the center of the read-head element 21, the specific point existing at a predetermined distance (Wb/2) from the end of the write-head element 22.

Namely, the position offset Ws that should be taken into account in the self-servo writing step differs from the position offset Wn that should be considered to achieve normal read/write operation of the disk drive 1.

(Sequence of the Self-Servo Writing Method)

In the self-servo writing method according to this embodiment, the write-head element 22 is positioned in accordance with the servo data the read-head element 21 has read from the medium 6, at the same time the write-head element 22 writes other servo data on the disk-shaped medium 6. To accomplish this, two servo-data items are recorded on the disk-shaped medium 6.

More precisely, one servo-data item is the servo data (ordinary servo data) that is used to perform normal read/write operation. The other servo-data item is the measuring servo data that is used to measure the position offset between the read- and write-head elements. The measuring servo data is identical in format to the servo data for positioning the head 2.

Figure 12:
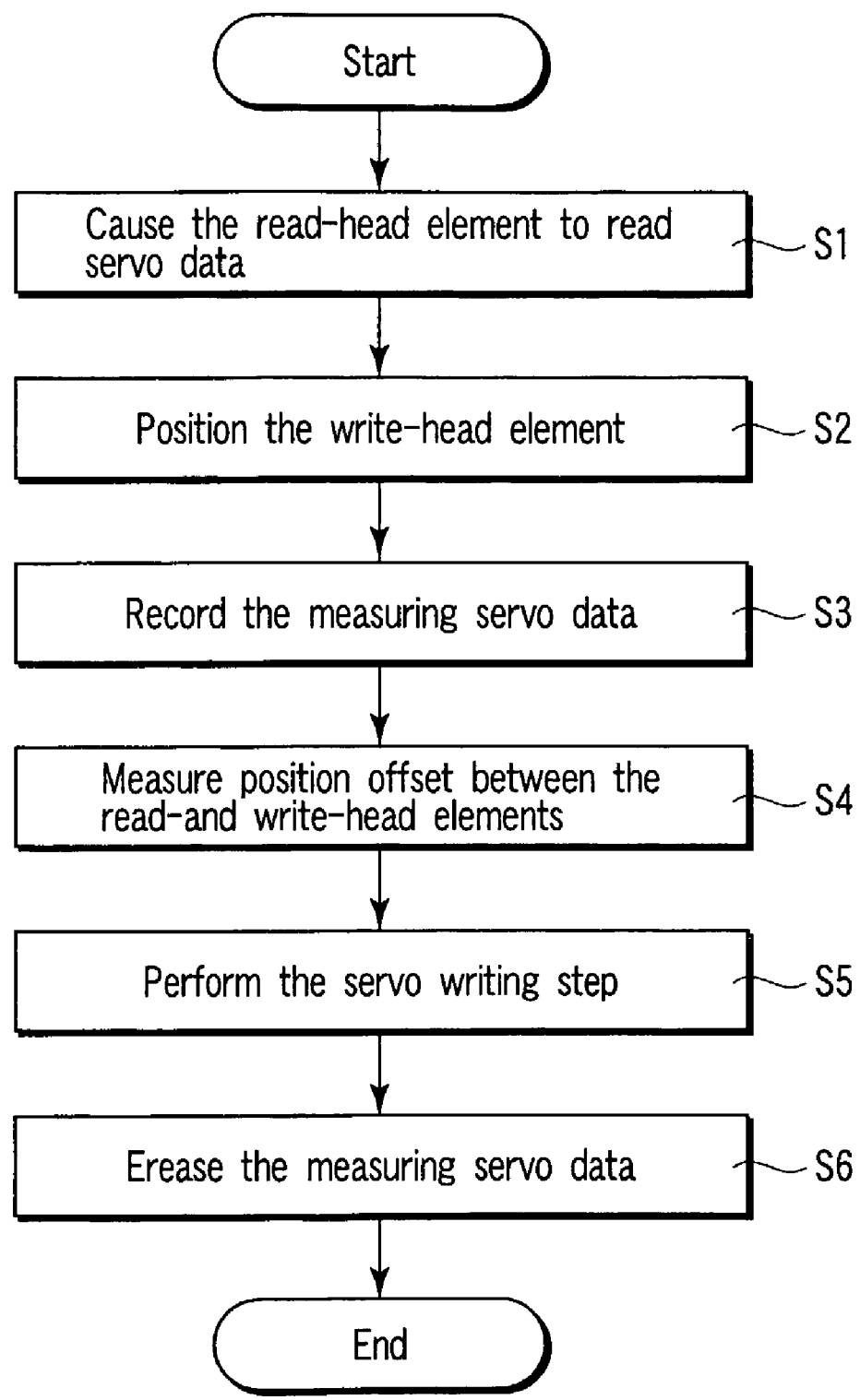
FIG. 12 is a flowchart explaining the sequence of a self-servo writing method according to the embodiment.

The sequence of the self-servo writing step that uses these two servo-data items will be explained, with reference mainly to the flowchart of FIG. 12.

As auxiliary servo pattern is recorded on the disk-shaped medium 6 incorporated in the disk drive 1. More specifically, the auxiliary servo pattern is recorded in a few innermost or outermost tracks (at least one track). The servo writer 10 causes the read-head element 21 to read the auxiliary servo pattern. In accordance with the auxiliary servo pattern thus read, the servo writer 10 drives the VCM 4, which in turn rotates the actuator 3. The actuator 3 brings the write-head 22 to the track in which the first servo data should be written. The write-head element 22, thus positioned, records the first servo data (i.e., head-positioning servo data) in that track.

Next, the servo writer 10 causes the read-head element 21 to read the positioning servo data, i.e., the servo data already recorded. In accordance with the positioning servo data the servo writer 10 positions the write-head element 22 at the first track in which servo data should be written (Steps S1 and S2). The servo writer 10 makes the write-head element 22 record the servo data in the first track (Step S3). The servo data thus recorded by the write-head element 22 is measuring servo data that has the same format as the positioning servo data. The measuring servo data is a copy of the positioning servo data recorded at the position that has been set on the basis of the position offset the between the head elements 21 and 22.

From the positioning servo data and the measuring servo data, both recorded on the disk-shaped medium 6, the servo writer 10 determines the position offset that the head elements 21 and 22 had during the servo writing operation (Step S4). Then, the servo writer 10 causes the head 2 to record servo data (both positioning servo data and measuring servo data) on the medium 6, while controlling the positioning of the head 2 in accordance with the position offset between the head elements 21 and 22 (Step S5).

When finishing the self-servo writing, the servo writer 10 erases the measuring servo data (including the auxiliary servo pattern) from the disk-shaped medium 6 (Step S6). As a result, only the positioning servo data remains recorded on the disk-shaped medium 6. The positioning servo data is ordinary servo data the disk drive 1 uses to perform the ordinary read/write operation.

Figure 7A:
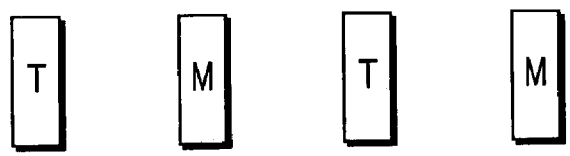
FIGS. 7A to 7C are diagrams explaining the sequence of writing the servo data in the embodiment.
Figure 7B:
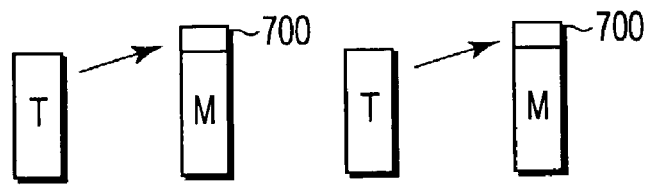
Figure 7C:
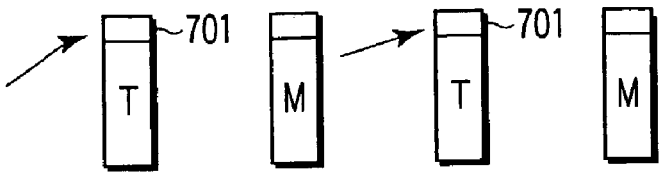

FIGS. 7A to 7C are diagrams showing the self-servo writing method that uses two servo-data items. That is, the method uses servo data (T) and servo data (M), to control the positioning of the head 2.

The servo data (T) corresponds to, for example, the positioning servo data, whereas the servo data (M) corresponds to the measuring servo data. As FIG. 7B shows, the read-head element 21 is positioned in accordance with the servo data (T), and the write-head element 22 writes the servo data (M) in addition to the servo data (T).

Alternatively, the read-head element 21 may be positioned in accordance with the servo data (M), and the write-head element 22 writes the servo data (T) in addition to the servo data (M), as is illustrated in FIG. 7C.

(Measuring the Positional Offset between the Head Elements)

Figure 8:
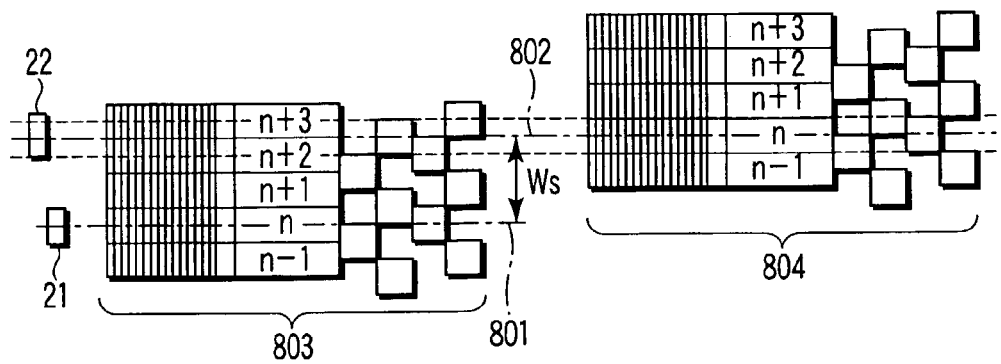
FIGS. 8 and 9 are diagrams a method of measuring the position offset in the embodiment.

FIG. 8 is a diagram explaining how to measure the position offset Ws in the self-servo writing step carried out in the embodiment.

The servo writer 10 uses the servo data 803 (e.g., positioning servo data) already recorded on the medium 6, to moving the read-head element 21 at a predetermined position. To position the head element 21 in this way, the servo writer 10 sets the reference position 801 for the read-head element 21, regardless of the position offset between the read- and write-head elements.

The distance 802 shown in FIG. 8 is the predetermined distance (Wb/2) between the above-mentioned specific point and the end of the write-head element 22. The servo writer 10 causes the write-head element 22 to write (copy) the servo data 803 read by the read-head element 21, which is used as measuring servo data 804. As indicated above, the measuring servo data 804 is identical in format to the positioning servo data 803 and written in the same way as the positioning servo data 803.

Thus, the measuring servo data 804 is written at a distance equal to the position offset Ws, from the position where the positioning servo data 803 has been written. The data 803 and the data 804 contains a servo mark each. The servo writer 10 performs a process, making the servo marks contained in the data items 803 and 804 different from each other. Hence, the positioning servo data 803 and the measuring servo data 804 can be distinguished from each other, with reference to the servo marks.

The measuring servo data 804 is identical in format to the positioning servo data 803. Therefore, no servo-data decoding circuit needs to be used. Containing a cylinder code, the measuring servo data 804 can be reliably detected even if the position offset Ws between the head elements 21 and 22 extends over several tracks.

Figure 9:
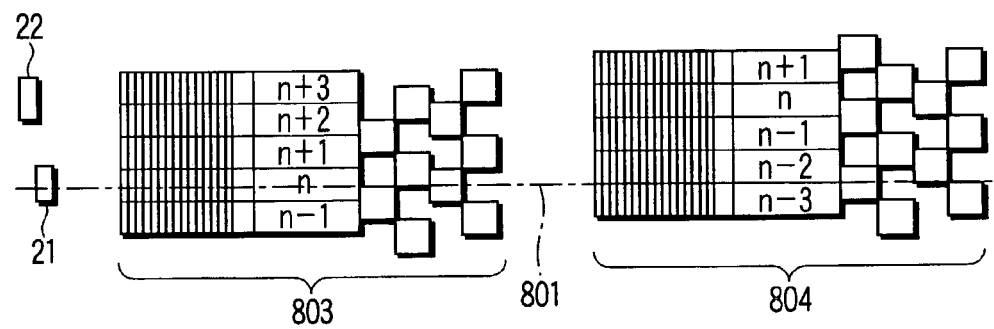

The method of measuring the position offset Ws from the measuring servo data 804 will be described in detail, with reference to FIG. 9.

The servo writer 10 drives the VCM 4, moving the read-head element 21 (to the reference position 801), in accordance with the positioning servo data 803 that the read-head element 21 has read. At the same time, the servo writer 10 read causes the read-head element 21 to read the measuring servo data 804. Note that the position error data (i.e., servo-burst pattern) read from the positioning servo data 803 is different from the position error data (i.e., servo-burst pattern) read from the measuring servo data 804.

The position offset Ws between the read- and write-head elements is given as follows:

$$Ws = PESd - PESt \qquad (1)$$

where PESt is the position error data read from the positioning servo data 803 and PESd is the position error data read from the measuring servo data 804.

Thus, the servo writer 10 can accurately measure an offset required for controlling the positioning the write-head element 22, from the position offset Ws calculated by the equation (1) in the self-servo writing step. To cancel the error detected, it is desirable to find an average of the position errors obtained from the servo data items written in each track of the disk-shaped medium 6, and to calculate the position offset Ws from the average position error.

(Modification of the Positional-Offset Measuring Method)

Figure 10:
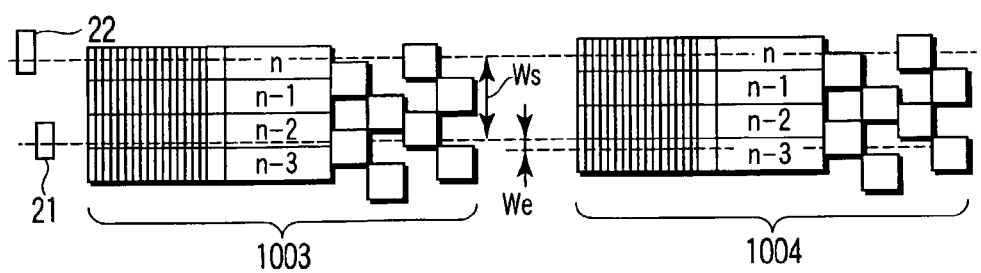
FIG. 10 is a diagram explaining a modification of the method of measuring the position offset.

FIG. 10 is a diagram explaining a modification of the method of measuring the position offset between the read- and write-head elements in the present embodiment. The modified method uses the measuring servo data after the position offset has been adjusted in accordance with the offset Ws measured beforehand.

To state it more precisely, the servo writer 10 adjusts the position offset in accordance with the offset Ws already determined, and then moves the read-head element 21 to a position in accordance with positioning servo data 1003. The read-head element 21 thus positioned reads measuring servo data 1004.

In this case, the position offset We is given as follows:

$$We = PESd - PESt \qquad (2)$$

where PESt is the position error data read from the positioning servo data 1003 and PESd is the position error data read from the measuring servo data 1004.

This position offset We is a difference between the position offset Ws already obtained and the actual position offset between the read- and write-head elements. The normal position offset Wt between the read- and write-head elements is therefore given as follows:

$$Wt = Ws - We \qquad (3)$$

In the modified method, the servo writer 10 can update the normal position offset Wt on the basis of the position offset Ws already measured and the actual position offset We between the read- and write-head elements. That is, the servo writer 10 can update the normal position offset Wt, while moving the head 2 over the disk-shaped medium 6 during the self-servo writing step. To apply the updated (or adjusted) offset effectively to the positioning of the head 2, it is necessary to move the read-head element 21 for a distance equal to or longer the position offset Ws between the read- and write-head elements.

As described above, the position offset between the read- and write-head elements can be updated as the head 2 is moved in the modified method of measuring the position offset. This renders it possible to record the servo data in the self-servo writing step, with high precision in accordance with the track density.

Figure 11A:
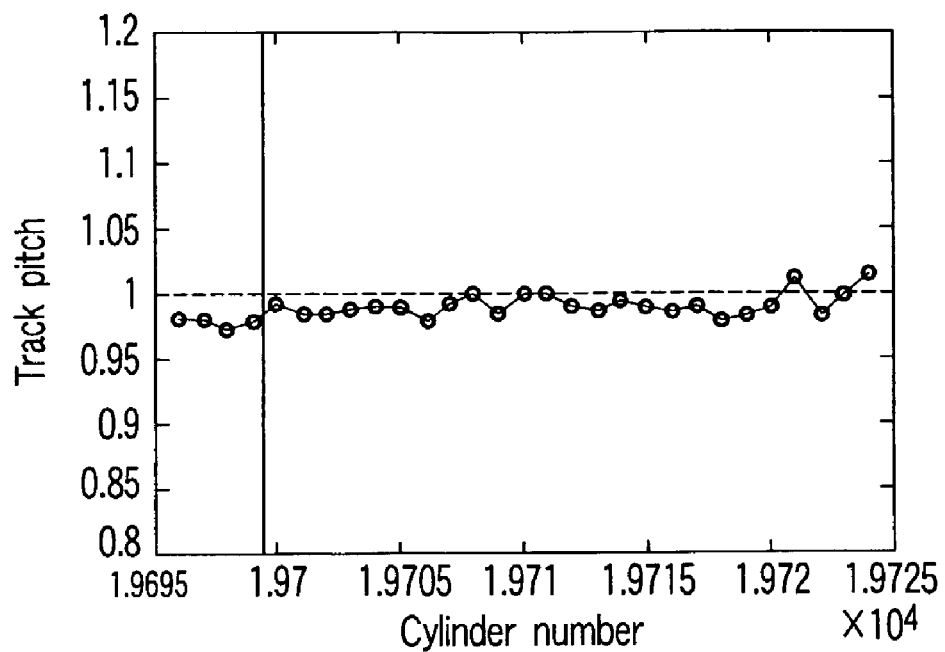
FIGS. 11A and 11B are graphs demonstrating the advantage of the modified method.
Figure 11B:
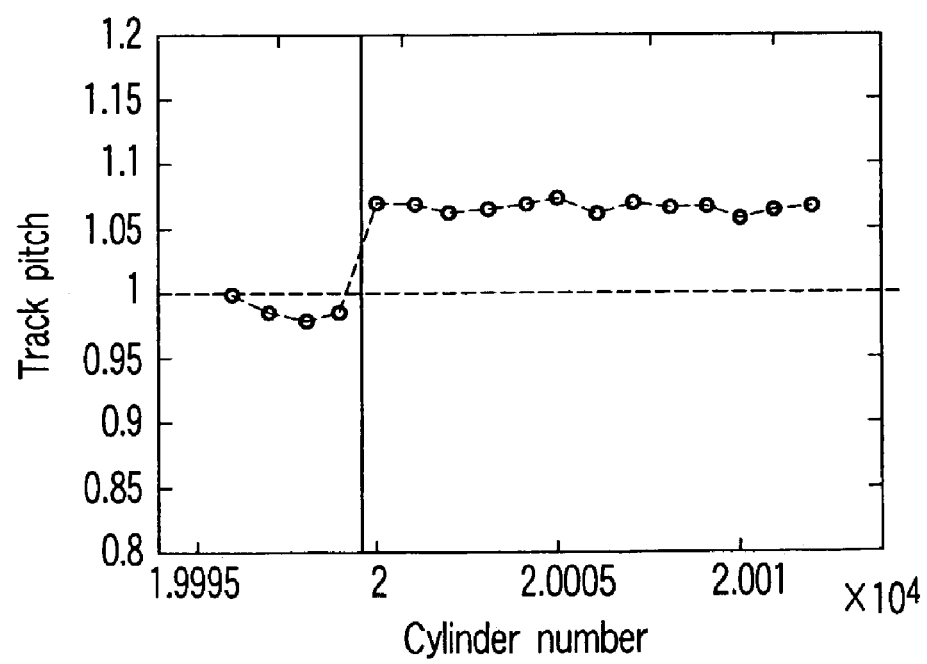

FIG. 11A shows the relation that the cylinder number and the track pitch have when the actual position offset is adjusted on the basis of the measured position offset Ws. The reference value for the track pitch is 1. It is desired that the actual track pitch fall within a narrow range above and below the reference value. FIG. 11B shows the relation that the cylinder number and the track pitch have when the actual position offset is not adjusted at all. Both FIG. 11A and FIG. 11B illustrate the results of the experiments in which servo data was recorded by the self-servo writing method, in addition to the servo data written at the normal track pitch.

The self-servo writing method according to the embodiment uses two servo-data items, i.e., the positioning servo data and the measuring servo data, whereby the position offset between the read- and write-head elements is measured and updated repeatedly. Namely, the offset is adjusted on the basis of the measured position offset, thus positioning the write-head element 22 with high precision. The high-precision servo data can therefore be written, while maintaining the high track density.

As has been described in detail, the embodiment of the invention can measure the position offset between the read- and write-head elements incorporated in the disk drive, with high precision in the self-servo writing step. As a result, the embodiment can write high-precision servo data on the disk-shaped medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of self-servo writing in a disk drive that has a head and a disk-shaped medium, the head having a write-head element and a read-head element, the method comprising:

(a) reading positioning servo data recorded on the disk-shaped medium by using the read-head element;

(b) positioning the write-head element at a desired track provided on the disk-shaped medium, by using the positioning servo data read by the read-head element;

(c) recording measuring servo data in the desired track by using the write-head element, the measuring servo data including same position information as that of the positioning servo data;

(d) positioning the read-head element at the desired track by using the positioning servo data read by the read-head element; and (e) reading the positioning servo data and the measuring servo data, both read by the read-head element;

(f) obtaining two position errors from, respectively, the positioning servo data and the measuring servo data, both read by the read-head element; and (g) calculating a position offset between the read-head element and the write-head element, from the two position error data.

2. The method according to claim 1, wherein the measuring servo data contains positioning servo data and other data distinguished from the positioning servo data.

3. The method according to claim 1, wherein in the step (g), position error data items are calculated for a plurality positions on the disk-shaped medium, from the positioning servo data and the measuring servo data, and the position offset is calculated from an average of the position error data items.

4. The method according to claim 1, wherein in the step (b), the offset is adjusted by using a preset position offset in order to position the write-head element at the desired track in accordance with the positioning servo data.

5. The method according to claim 1, further comprising: obtaining a normal position offset on the basis of the position offset and another calculated position offset.

6. A self-servo writing apparatus for use in a disk drive having a head including a read-head element and a write-head element, and a disk-shaped medium, said apparatus comprising:

a first unit which causes the write-head element to record positioning servo data and measuring servo data on the disk-shaped medium at a desired track provided on the disk-shaped medium, the measuring servo data including same position information as that of the positioning servo data; and a second unit which positions the read-head element at the desired track by using the positioning servo data read by the read-head element and calculates a position offset between the read-head element and the write-head element using two position error data obtained from the positioning servo data and the measuring servo data, both read by the read-head element.

7. The apparatus according to claim 6, wherein the measuring servo data contains positioning servo data and also contains other data distinguished from the positioning servo data.

8. A disk drive comprising:

a disk-shaped recording medium;

a head which has a read-head element and a write-head element spaced apart from each other;

a first unit which causes the write-head element to record positioning servo data on the disk-shaped recording medium, the positioning servo data being to be used to position the head;

a second unit which positions the write-head element at a desired track on the disk-shaped recording medium in accordance with the positioning servo data read by the read-head element and which causes the write-head element to record measuring servo data at the desired track, the measuring servo data including same position information as that of the positioning servo data; and a third unit which positions the read-head element at the desired track by using the positioning servo data read by the read-head element and calculates a position offset between the read-head element and the write-head element using two position error data obtained from the positioning servo data and the measuring servo data, both read by the read-head element.

9. The disk drive according to claim 8, wherein the measuring servo data contains positioning servo data and also contains other data distinguished from the positioning servo data.

* * * * *